P. BOBICHON & A. FAURE.
SIGNAL DEVICE FOR MOTOR CARS AND OTHER VEHICLES.
APPLICATION FILED SEPT. 8, 1913.
1,258,741. Patented Mar. 12, 1918.
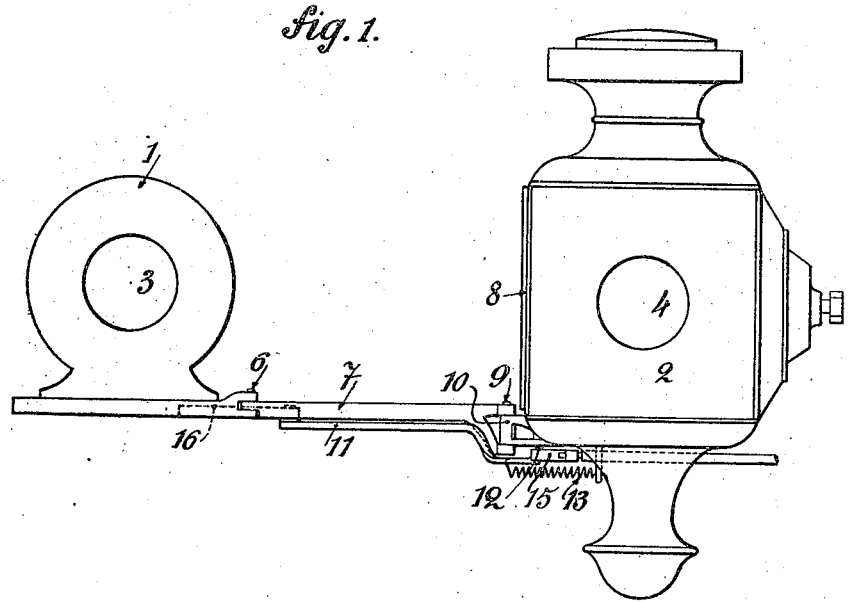
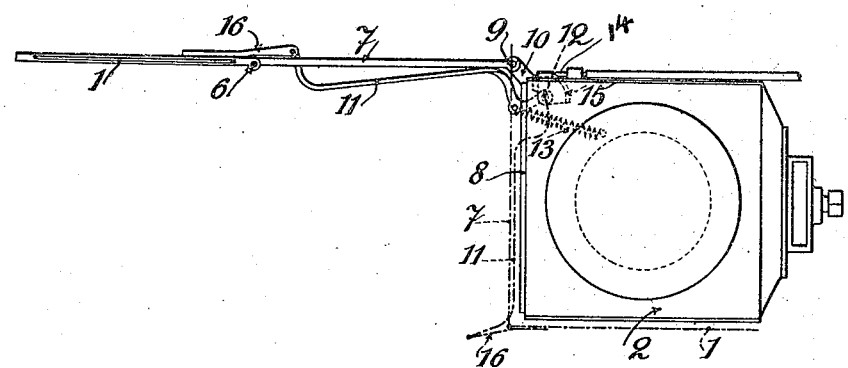
Witnesses:
Inventors
Paul Bobichon
and
Albert Faure
By H. B. Willson & Co.
Attorneys.

UNITED STATES PATENT OFFICE.

PAUL BOBICHON AND ALBERT FAURE, OF PARIS, FRANCE.

SIGNAL DEVICE FOR MOTOR-CARS AND OTHER VEHICLES.

1,258,741.      Specification of Letters Patent.    Patented Mar. 12, 1918.

Application filed September 8, 1913. Serial No. 788,736.

*To all whom it may concern:*

Be it known that we, PAUL BOBICHON and ALBERT FAURE, citizens of the Republic of France, residing at Paris, the first 79 Rue Laugier and the second 102 Rue des Dames, in the Republic of France, engineers, have invented certain new and useful Improvements in Signal Devices for Motor-Cars and other Vehicles, of which the following is a specification.

This invention relates to a signal device designed to be located on motor-cars and other vehicles for the purpose of facilitating the traffic in towns, in allowing the driver to indicate that he is going to turn and follow a direction perpendicular to the previous one, such indication being visible from the side, the rear and even from the front of the car.

Such signal device is located on one of the side lights and is so fitted as to be enabled to be spread out laterally from the car when the driver wants to indicate that he is going to turn in that direction, while the device remains normally closed and invisible so long as the car is running in the same direction.

For that purpose, the device comprises a movable shutter pivoted to a bracket which is also pivoted on the side light or any suitable part of the vehicle, such double pivotal connection allowing the signal device to come against the rear face of the side light when it is not in use, and to move away from the side light, to some distance in front of such side light, on being spread out. In both positions, it leaves the glass faces of the side light, in front and at the side, completely uncovered; it may be apertured to show also, when it is closed, the red light usually provided in the rear face of the side light. When spread out, it is lighted up, during the night, by such side light so as to be clearly seen from behind.

The signal device will be controlled by any suitable gearing within reach of the driver.

One embodiment of this invention is shown by way of example in the accompanying drawings, in which:—

Figure 1 is a rear elevation of a side lamp provided with a spread out signal device; and Fig. 2 is a corresponding plan view, in which the position of the closed signal device is shown in dotted lines.

1 designates the signal device properly so called, consisting, for instance, of an enameled sheet metal plate, the dimensions of which are approximately those of the rear face 2 of the lamp. It is provided with a circular opening corresponding to the light opening 4 of the rear face.

The pivot or hinge 6 connects the signal device 1 with a bracket 7 which is also hinged at 9 on a foot 10 secured to the front angle of the side lamp.

The foot 16 rigidly secured to the lower part of the signal device 1 is connected with the lamp by an arm 11 the pivot 12 of which is so chosen or fitted that the signal device is caused to turn with respect to the bracket 7 as the latter is turning with respect to the side lamp, whereby the angle of the signal device in regard to the bracket 7 varies between 90 degrees, in the closed position, and 180 degrees, in the spread out position.

The signal device is normally restored to its closed position by the action of a spring 13 acting for instance on the arm 11. On the other hand it is brought to the spread out position by the pulling action of a cable 14 attached to the grooved sector 15 associated with the arm 11 and led into a flexible sheath within reach of the driver.

The signal device may be mounted on the lamp support or other suitable part of the car, instead of being mounted direct on the side lamp; if desired, the device may be guided and sustained by any suitable mechanical, pneumatic, electric or other gearing.

A signal device may be arranged on either one or both the lamps, as required.

Claim:

The combination with a vehicle side lamp, of a signal device comprising a horizontally swinging arm having one end pivoted at one front corner of said lamp, said arm being normally swung inwardly toward the outer side of said lamp but being movable outwardly into angular relation to said outer side, a signal plate pivoted at one edge to the free end of said arm and normally disposed at the rear side of said lamp, said signal plate having a lateral projection extending beyond its hinged edge, and a link pivoted at one end to said projection and pivoted at its other end to a fixed part spaced from the pivotally mounted end of said arm; together with means for swinging the device to operative and inoperative positions.

In testimony, that we claim the foregoing as our invention we have signed our names in presence of two subscribing witnesses.

PAUL BOBICHON.
ALBERT FAURE.

Witnesses:
HANSON C. COXE,
MAURICE ROUX.

Copies of this patent may be obtained for five cents each, by addressing the "Commissioner of Patents, Washington, D. C."